United States Patent [19]

Blaugher et al.

[11] Patent Number: 4,717,437
[45] Date of Patent: Jan. 5, 1988

[54] LOW MODULUS DAMPING FILM

[75] Inventors: Richard D. Blaugher, Pittsburgh, Pa.; Robert L. Kolek, Cupertino, Calif.

[73] Assignee: The United States of America as represented by the Secretary of the Air Force, Washington, D.C.

[21] Appl. No.: 870,044

[22] Filed: Jun. 3, 1986

[51] Int. Cl.$^4$ ............................................. H02K 15/04
[52] U.S. Cl. ........................................ 156/52; 29/596; 29/605; 335/216
[58] Field of Search ........................... 156/185, 53, 52; 335/216; 336/206, 219; 29/605, 596; 525/462

[56] References Cited

U.S. PATENT DOCUMENTS

| | | | |
|---|---|---|---|
| 3,416,111 | 12/1968 | Bogner | 335/216 X |
| 3,662,461 | 5/1972 | Lake et al. | 29/605 |
| 3,705,372 | 12/1972 | Gotal et al. | 336/182 |
| 3,931,108 | 1/1976 | Binsack | 525/462 X |
| 3,991,333 | 11/1976 | Laskaris | 310/52 |
| 4,037,312 | 7/1977 | Deis | 29/598 |
| 4,038,741 | 8/1977 | Schuler | 29/596 |
| 4,467,303 | 8/1984 | Laskaris | 335/216 |

OTHER PUBLICATIONS

Dimensional Behavior of Thin-Film Dielectric Polymers in the Temperature Range 4.2 to 300 K, Jelinek & Muller, 7/22/75 (1st Inter. Cyrogenic Mat'ls Conf.) Plenum Press, New York, pp. 312–315.

Non Metallic Materials and Composites at Low Temperatures, Muller, 1978, International Cyrogenic Materials Conference Board, pp. 339–363.

Primary Examiner—David Simmons
Attorney, Agent, or Firm—Bernard E. Franz; Donald J. Singer

[57] ABSTRACT

A film is disclosed which will accommodate high shear strain in a rigidly supported epoxy impregnated $Nb_3Sn$ superconducting coil (SCC). In a generator application the SCC is subjected to a combined load due to differential thermal contraction, magnetic, and centrifugal forces. These strains could lead to coil fracture and resulting degradation of the field and current-carrying properties. A low modulus material at the interface between the SCC and support structure will reduce or distribute the shear strain to an acceptable level, i.e., no degradation in current carrying properties. Two film materials, polyethylene terephthalate Mylar (DuPont Chemical) and polycarbonate Makrofol KG (Mobay chemical) are disclosed as suitable damping or interface films. An adhesive such as the polyurethane Bostik 7070 is used for affixing the film to the winding surface.

3 Claims, 2 Drawing Figures

LOW MODULUS DAMPING FILM

RIGHTS OF THE GOVERNMENT

The invention described herein may be manufactured and used by or for the Government of the United States for all governmental purposes without the payment of any royalty.

BACKGROUND OF THE INVENTION

This invention relates to a low modulus damping film, and more particularly to a coil winding support for superconducting generator applications.

Superconducting generator applications require fast spin-up and rapid excitation. This start-up requirement necessitates a high field, high current advanced conductor such as $Nb_3Sn$, and a winding design which offers uniform mechanical support to prevent conductor motion. A fully epoxy impregnated winding of multistranded $Nb_3Sn$ conductor satisfies both of these requirements. U.S. Pat. No. 3,991,333 shows a typical superconductive generator of this type, showing the use of Mylar inserted between each winding and its adjacent supports, to provide electrical insulation for the windings.

The epoxy-impregnated winding, however, must be rigidly supported with additional precompression to accommodate the centrifugal forces. As a result the coil winding support for a satisfactory design must be intimately interfaced with the impregnated winding. High shear strains can thus be transferred to the coil module which may facture and degrade the winding operation.

U.S. Pat. No. 4,037,312 to Deis discloses an insulating material of a layer of phenolic modified polyvinyl formal covered or coated with a bonding material of epoxy applied to a wires of a cable in a superconductive rotor coil. U.S. Pat. Nos. 3,662,461 to Lake, 3,705,372 to Gotal and 4,467,303 to Laskaris are also of interest.

SUMMARY OF THE INVENTION

An object of the invention is to provide a low modulus interface material which will be able to absorb shear strain due to a combined compression-tension load due to differential thermal contraction.

The invention relates to a low modulus damping film which occupies the interface area between the outer winding surfaces and the winding support of an epoxy impregnated $Nb_3Sn$ superconductor in a generator. The polycarbonate Makrofol KG (Mobay chemical) 16 disclosed as the preferred damping or interface film. An adhesive such as the polyurethane Bostik 7070 is used for affixing the film to the winding surface.

DETAILED DESCRIPTION

Figure 1:
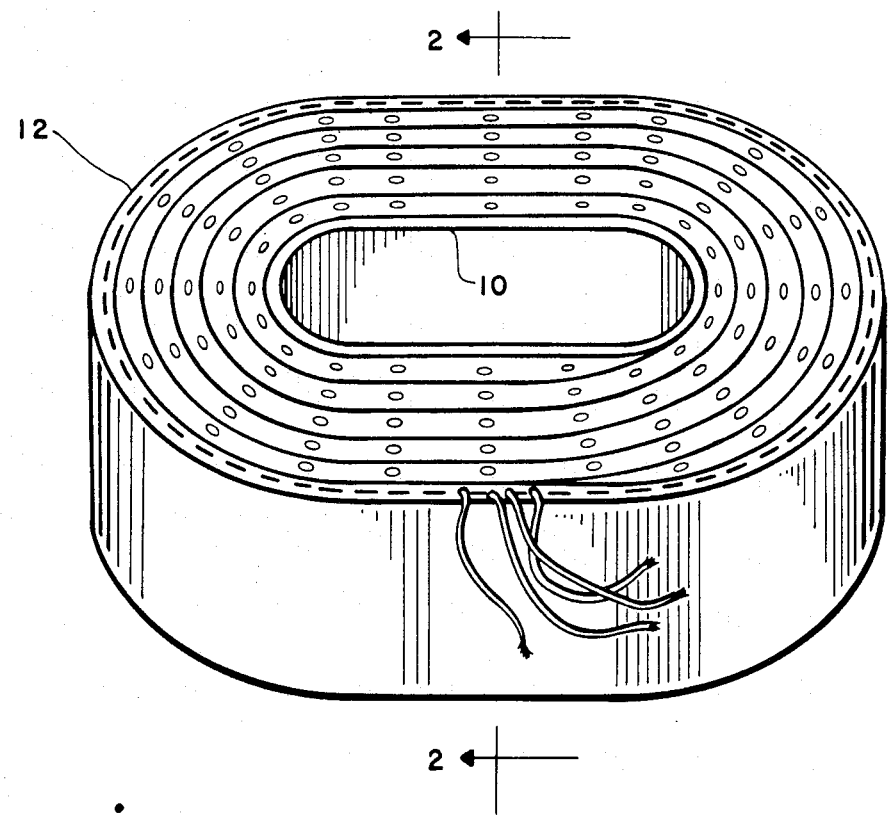
FIG. 1 is a perspective view.
Figure 2:
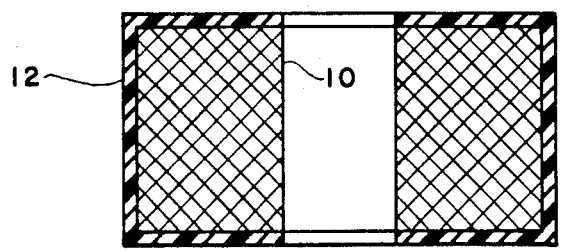
FIG. 2 is a cross section view taken along lines 2—2 of FIG. 1, of a fully impregnated $Nb_3Sn$ coil module to which the Makrofol (polycarbonate) film was satisfactorily applied.

The low modulus damping film occupies the interface area between the outer winding surfaces and the winding support. This film must be able to absorb shear strain due to a combined compression-tension load due to differential thermal contraction, magnetic, and centrifugal forces. Pertinent mechanical and physical property information on thin film polymers were identified in two references, (1) Muller, A. C., "Properties of Plastic Tapes for Cryogenic Power Cable Insulation", 1978 ICMC Meeting, July 10–11, Munich, Germany; and (2) Jelinek, F. and Muller, A. "Study of the Dimensional Behavior of Various Thin-Film Polymers in the Temperature Range 4.2° K. to 300° K.", Advances in Cryogenic Eng. 22, 312 (1977). Two materials were selected as suitable, Mylar and Polycarbonate. Mylar or polyethylene terephthalate is a high molecular weight polyester with a relatively high melting point. The polycarbonate is a non-polar, linear polyester of carbonic acid derived from bisphenol A.

The significant properties of these two polymers are shown in Table I. The Mylar film is available from DuPont in various thicknesses. The specific polycarbonate is identified as Makrofol KG and is available from the Mobay Chemical Co. It is a semi-crystalline film biaxially oriented. The pertinent dielectric and tensile properties of these materials at 293° K. and 4° K. are shown in Table II. The data shows that both of these materials maintain high elongation at 4° K. In the Muller paper (reference 1) mention is made that certain polymeric thin films fracture when cooled to 6° to 10° K., while other materials resist thermal fracture consistently. Those materials which fracture readily have elongations only slightly larger than their contractions. Those materials having elongations greater by a factor of ten or more always resist fracture. Table II shows that for Mylar this ratio is 10 and for the Makrofol KG it is 22.

In view of the superior elongation properties of the Makrofol KG (polycarbonate) this material should be more effective as a damping interface. The recent superconducting rotor dynamics program funded by the Air Force selected this material for the coil winding interface. A polyurethane adhesive (Bostik 7070) was used for affixing the film to the winding surface. The adhesive was applied by diluting the Bostik with methylene chloride and spraying the diluted mixture.

Thermal cycling by rapid cooling in liquid nitrogen did not show any crazing, cracking or lifting of the film. A low modulus damping film Makrofol KG-polycarbonate has been identified and experimentally evaluated as an interface material for superconducting coils.

TABLE I

| PROPERTIES OF MYLAR AND POLYCARBONATE | | |
|---|---|---|
| Significant Properties | Mylar | Polycarbonate |
| Density (295° K.) | 1.38 gm/cc | 1.2 gm/cc |
| Crystalline Melting Point | 538° K. | 535° K. |
| Molecular Weight | 1,300–1,600 | 50,000–90,000 |
| Crystallinity | Amorphous | Crystalline |
| Chemical Resistance | Good | Good |
| Tensile Strength (295° K.) 100,000 psi (fiber) | 20,000 psi (film) | 14,000 psi |
| Thermal Expansion Coefficient (295° K.) | $5 \times 10^{-5} K^{-1}$ | $6 \times 10^{-5} K^{-1}$ |
| Dielectric Constant ($10^5$ Hz, 295° K.) | 3.05 | 2.95 |
| Dielectric Constant ($10^5$ Hz, 295° K.) | 0.01 | 0.003 |

TABLE II

| DIELECTRIC AND TENSILE PROPERTIES OF MYLAR AND MAKROFOL KG | | | | |
|---|---|---|---|---|
| | Mylar | | Makrofol KG | |
| Property | 293° K. | 4° K. | 293° K. | 4° K. |
| Dissipation Factor (tan δ 33 $10^6$) | — | 200 | — | 55 |
| Dielectric Constant | — | 2.5 | — | 2.9 |

TABLE II-continued
DIELECTRIC AND TENSILE PROPERTIES OF MYLAR AND MAKROFOL KG

| Property | Mylar 293° K. | Mylar 4° K. | Makrofol KG 293° K. | Makrofol KG 4° K. |
| --- | --- | --- | --- | --- |
| Yield Strength ($N/m^2 \times 10^{-7}$) | 6.53 | 19.0 | 4.93 | 16.8 |
| Tensile Strength ($N/m^2 \times 10^{-8}$) | 1.50 | 3.48 | 1.10 | 2.48 |
| Tensile Modulus ($N/m^2 \times 10^{-9}$) | 4.01 | 4.53 | 3.48 | 4.55 |
| Total Elongation, % | 114 | 6.1 | 72.2 | 10.8 |
| Thermal Contraction (293–4.2 K), % | 0.479 | | 0.474 | |
| Thermal Conductivity (Watts/cm-K) | — | — | $6 \times 10^{-4}$ | $9 \times 10^{-5}$ |
| Coefficient of Friction, MS | — | | 0.438 | |
| Elongation/Contraction, T | 10 | | 22 | |

The drawing shows a fully impregnated Nb$_3$Sn coil module to which the Makrofol (polycarbonate) film was satisfactorily applied. The coil 10 has the polymer film 12 applied to the outer surface, as well as the upper and lower surfaces, as shown. The polymer film is affixed to the winding surface with the adhesive (not shown). In the perspective view of FIG. 1, the winding spiral shows through the thin polymer film.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. The method using a polymer as a low modulus damping film in the interface area between the outer winding surfaces and the winding support of an epoxy impregnated winding of multi-stranded Nb$_3$Sn superconductor in a generator; said polymer being a polycarbonate which is a non-polar, linear polyester of carbonic acid derived from bisphenol A, which at cryogneic temperature has a ratio of elongation to contraction of at least 10; and using an adhesive for affixing the film to the winding surface.

2. The method according to claim 1, wherein said polymer is that available from Mobay chemical under the trade name Makrofol KG.

3. The method according to claim 2, wherein said adhesive is the polyurethane available under the tradename Bostik 7070, applied by diluting the adhesive with methylene chloride and spraying the diluted mixture.

* * * * *